United States Patent [19]

Morita et al.

[11] Patent Number: 4,534,411

[45] Date of Patent: Aug. 13, 1985

[54] MICELLAR SLUG FOR OIL RECOVERY

[75] Inventors: Hiroshi Morita, Chiba; Yasuyuki Kawada, Funabashi; Junichi Yamada, Narashino; Toshiyuki Ukigai, Chiba, all of Japan

[73] Assignee: Lion Corporation, Tokyo, Japan

[21] Appl. No.: 475,602

[22] Filed: Mar. 15, 1983

[30] Foreign Application Priority Data

Mar. 16, 1982 [JP] Japan ............................... 57-040290

[51] Int. Cl.$^3$ .............................................. E21B 43/22
[52] U.S. Cl. ............................. 166/274; 252/8.55 D; 252/312
[58] Field of Search .......................... 252/8.55 D, 312; 166/274, 275

[56] References Cited

U.S. PATENT DOCUMENTS

| 3,506,070 | 4/1970 | Jones | 252/8.55 |
| 3,508,611 | 4/1970 | Davis et al. | 252/309 X |
| 3,536,136 | 10/1970 | Jones | 166/275 |
| 3,981,361 | 9/1976 | Healy | 252/8.55 X |
| 3,990,515 | 11/1976 | Wilchester et al. | 166/273 |

FOREIGN PATENT DOCUMENTS 1031686  5/1978  Canada ................................ 166/274

Primary Examiner—Herbert B. Guynn
Attorney, Agent, or Firm—Armstrong, Nikaido, Marmelstein & Kubovcik

[57] ABSTRACT

A micellar slug for use in the recovery of oil, the slug containing a hydrocarbon, an aqueous medium, a surfactant, and a cosurfactant. The surfactant contains as essential components (a) at least one alpha-olefin sulfonate having 10 to 30 carbon atoms and (b) at least one ethoxylate selected from the group consisting of polyoxyethylene alkyl ethers and polyoxyethylene alkylphenyl ethers in a weight ratio of component (a) to component (b) of 8/2 to 3/7. The micro-emulsion can be formed from this micellar slug in a wide composition range. Furthermore, this micellar slug has an excellent salinity tolerance and hard-water resistance.

2 Claims, No Drawings

MICELLAR SLUG FOR OIL RECOVERY

BACKGROUND OF THE INVENTION

1. Field of the Invention

This invention relates to a micellar slug suitable for use in a micellar drive for recovering oil from subterranean reservoirs. More specifically, it relates to a micellar slug, suitable for use in a micellar drive for recovering oil from subterranean reservoirs, which is capable of forming micro-emulsions at a high salt concentration and which has a large capability to maintain the micro-emulsions against change in the composition of the micro-emulsions due to the fact that the micellar slug is capable of forming micro-emulsions in a wide composition range.

2. Description of the Prior Art

So-called "primary recovery" methods, including pumping methods, can recover only a portion of the petroleum or crude oil ("oil") from subterranean reservoirs and leave substantial amounts of oil in the subterranean reservoirs. So-called various "enhanced oil recovery" (EOR) methods have been proposed to recover the remaining large amounts of oil from the subterranean reservoirs.

Of these EOR methods, the recent "micellar drive" methods are to be noted. According to these methods, a micellar slug, that is, a clear micro-emulsion derived from water and oil such as petroleum, petroleum distillates, or fuel oil, is injected under pressure into the subterranean reservoirs for the recovery of oil in the subterranean reservoirs. These micellar drive methods are disclosed in, for example, U.S. Pat. Nos. 3,506,070, 3,613,786, 3,740,343, 3,983,940, 4,017,405, and 4,059,154. These prior arts disclose that various kinds of surfactants including anionic-, nonionic-, and cationic-type surfactants can be used alone or in any mixture thereof in the formation of micellar slugs. Examples of such surfactants are petroleum sulfonates, alkylaryl sulfonates, dialkyl sulfosuccinates, alkane sulfonates, polyoxyethylene alkylether sulfates, polyoxyethylene alkylethers, polyoxyethylene alkylphenylethers, polyol fatty acid esters, alkyltrimethyl ammonium salts, and dialkyldimethyl ammonium salts.

The surfactants used in the formation of a micellar slug must be available at a low cost, while still displaying the required performances, since a large amount of a micellar slug is necessary to recover oil from subterranean reservoirs. In addition, the numerous oil production wells or oilfields present in the world include subterranean reservoirs with a variety of properties. The available water also varies from soft water containing no substantial amounts of inorganic salts to brine containing large amounts of inorganic salts and polyvalent metallic ions. Thus, the surfactants used in micellar slugs should also have good thermal stability, salinity tolerance, and hard-water resistance.

It is believed in the art that petroleum sulfonate is an optimum surfactant usable as an injection fluid in a micellar drive due to its availability and low cost. However, a problem exists in that petroleum sulfonate has an unsatisfactory salinity tolerance and hard-water resistance, and, therefore, can be applied only for certain oilfields. For this reason, various attempts have been made to improve the properties of petroleum sulfonate by using petroleum sulfonate together with other surfactants. However, micellar slugs having the desired properties and a satisfactory cost have not been obtained.

We have proposed, in U.S. patent application Ser. No. 415,840 filed on Sept. 8, 1982, the use of an alpha-olefins sulfonate as a surfactant capable of providing a micellar slug having an interfacial tension decreasing capability equal to or more than that of a micellar slug containing petroleum sulfonate and having an excellent salinity tolerance and hard-water resistance and a relatively high viscosity. However, the micro-emulsion formed when a micellar slug is prepared by using an alpha-olefin sulfonate, is likely to be destroyed when injected under pressure into subterranean reservoirs due to the fact that the composition range within which a micro-emulsion can be formed is not very wide. Accordingly, this micellar slug should be further improved from a practical viewpoint.

SUMMARY OF THE INVENTION

The objects of the present invention are to eliminate the above-mentioned problems of the prior arts and to provide, for the recovery of oil, a micellar slug having an excellent salinity tolerance and hard-water resistance, and being capable of forming a micro-emulsion in a wide composition range.

A further object of the present invention is to provide an oil recovery process using a micellar slug without destroying the micro-emulsion when the composition of the micro-emulsion is changed when the micro-emulsion is injected under pressure into subterranean reservoirs.

Other objects and advantages of this invention will be apparent from the following description.

In accordance with this invention, there is provided a micellar slug, for the recovery of oil, consisting essentially of a hydrocarbon, an aqueous medium, a surfactant, and a cosurfactant, the surfactant containing, as essential components, (a) at least one alpha-olefin sulfonate having 10 to 30 carbon atoms and (b) at least one ethoxylate selected from the group consisting of polyoxyethylene alkyl ethers and polyoxyethylene alkylphenyl ethers in a weight ratio of component (a) to component (b) of 8/2 to 3/7.

In accordance with this invention, there is also provided a process for producing oil from an oil-bearing subterranean reservoir penetrated by a well which comprises the steps of injecting into the reservoir through the well a micellar slug consisting essentially of a hydrocarbon, an aqueous medium, a surfactant, and a cosurfactant, the surfactant containing, as essential constituents, (a) at least one alpha-olefin sulfonate having 10 to 30 carbon atoms and (b) at least one ethoxylate selected from the group consisting of polyoxyethylene alkyl ethers and polyoxyethylene alkylphenol ethers in a weight ratio of component (a) to component (b) of 8/2 to 3/7; injecting into the reservoir at least one driving fluid; and recovering oil from the reservoir through the production well.

DESCRIPTION OF THE PREFERRED EMBODIMENTS

The micellar slugs desirably used for the recovery of oil are transparent micro-emulsions containing about 4% to about 90% by weight of a hydrocarbon, about 4% to about 92% by weight of an aqueous medium, about 3% to about 30% by weight of a surfactant containing, as essential constituents, AOS having 10 to 30 carbon atoms and ethoxylate in a weight ratio of AOS to the ethoxylate of 8/2 to 3/7, and about 0.1% to about 20% by weight of a cosurfactant.

The aqueous medium usable in the formation of the micellar slug of this invention includes soft water, water containing inorganic salts, and brine. For example, rain water, river water, lake water, subterranean water, oil stratum water, and seawater can be freely used in the formation of the micellar slug of this invention.

The micellar slugs of this invention have excellent hard-water resistance and resistance to alkali metal salts. Accordingly, water or brine containing 0% to about 10% by weight, desirably about 0.1% to about 8% by weight, of inorganic salts can be used for the preparation of the micellar slugs of this invention. Typical examples of the inorganic salts contained in the water (or brine) are NaCl, KCl, $Na_2SO_4$, and $K_2SO_4$. For instance, seawater contains about 3.5% by weight of inorganic salts including about 1,600 ppm, in terms of a Mg ion, of divalent metal ions. This salt concentration is within the desirable salt concentration range of this invention.

Suitable alpha-olefin sulfonates contained as component (a) (i.e., one component of the surfactant) in the micellar slugs of this invention are those having 10 to 30 carbon atoms appropriately selected depending upon the natures of oilfields and subterranean reservoirs and upon the kinds of water (or brine) and cosurfactants to be used. The alpha-olefin sulfonates used in this invention are desirably those having 12 to 24 carbon atoms and, more desirably, those containing 50% by weight or more of alpha-olefin sulfonates having 14 to 22 carbon atoms.

The alpha-olefin sulfonates usable in this invention can be alkali metal salts, ammonium salts, and organic amine salts thereof. The desirable counter cations are Na, K, $NH_4$, and alkanolammonium. The sodium salts are readily available at a low cost.

Examples of alpha-olefin sulfonates usable in the formation of the micellar slugs of this invention are 1-dodecene sulfonate, 1-tetradecene sulfonate, 1-hexadecene sulfonate, 1-octadecene sulfonate, 1-eicosene sulfonate, 1-docosene sulfonate, alpha-olefin sulfonates (AOS) having 10 to 14 carbon atoms, AOS having 14 to 16 carbon atoms, AOS having 14 to 18 carbon atoms, AOS having 16 to 18 carbon atoms, and AOS having 20 to 24 carbon atoms.

The ethoxylates contained as component (b) (i.e., the other component of the surfactant) in the micellar slugs of this invention are those having the following general formula (I) or (II).

   (I)

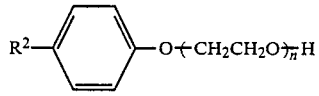   (II)

wherein $R^1$ is a linear or branched alkyl or alkenyl group having 10 to 18 carbon atoms, $R^2$ is a linear or branched alkyl group having 6 to 15 carbon atoms, m is a number of about 1 to about 10 on average, and n is a number of about 1 to about 15 on average.

Typical examples of the polyoxyethylene alkyl ethers (HAE) having the general formula (I) are polyoxyethylene hexyl ether (m=1), polyoxyethylene octyl ether (m=2), polyoxyethylene decyl ether (m=2.5), polyoxyethylene dodecyl ether (m=3), polyoxyethylene tetradecyl ether (m=3.5), polyoxyethylene hexadecyl ether (m=4), and polyoxyethylene octadecyl ether (m=5).

Typical examples of the polyoxyethylene alkylphenol ethers (APE) having the general formula (II) are polyoxyethylene hexylphenyl ether (n=1), polyoxyethylene octylphenyl ether (n=2), polyoxyethylene nonylphenyl ethers (n=4, 5, and 6), polyoxyethylene decylphenyl ether (n=6), polyoxyethylene tetradecylphenyl ether (n=7), polyoxyethylene tetradecylphenyl ether (n=8), and polyoxyethylene pentadecylphenyl ether (n=10).

The composition ranges of the micellar slugs of this invention capable of forming micro-emulsions are largely changed depending upon the ratio of the alpha-olefin sulfonate and the ethoxylate in the micellar slugs. The micro-emulsions can be formed in a wide composition range when the weight ratio of the alpha-olefin sulfonate to the ethoxylate is within the range of 8/2 to 3/7, desirably 7/3 to 4/6. Therefore, when the micellar slugs of this invention are injected under pressure into subterranean reservoirs, the micro-emulsions can be maintained within a wide composition range against changes in the composition thereof caused by the mixing with oil and subterranean water. The weight ratio of the alpha-olefin sulfonate to the ethoxylate of less than, or more than, the above-mentioned composition range results in a narrow composition range capable of forming the micro-emulsion and, therefore, is not suitable for practical use.

As mentioned above, the micellar slugs of this invention contain about 3% to about 30% by weight of the surfactant. However, the micellar slugs desirably contain about 5% to about 25% by weight of the surfactant, taking into consideration both low interfacial tensions and reasonable cost.

The hydrocarbons usable as an oil component in this invention include, for example, petroleum, liquefied petroleum gas, crude gasoline (naphtha), kerosene, diesel oil, and fuel oil. The recovered petroleum is desirably used due to its low cost and availability as well as its similar composition to that of the oil contained in subterranean reservoirs. As mentioned above, the micellar slugs of this invention can contain about 4% to about 90% by weight of hydrocarbons. The desirable concentration of hydrocarbons is within the range of about 5% to about 40% by weight whereby an oil-in-water (O/W) type emulsion is formed, since the use of a large amount of hydrocarbons is not economical.

The cosurfactants used in the formation of the micellar slugs of this invention are an essential constituent for forming micro-emulsions associated with the surfactants. The cosurfactants usable in this invention are alcohols, for example, alcohols having 2 to 8 carbon atoms, ethylene glycol monoethers of alcohols having 1 to 5 carbon atoms, and diethylene glycol monoethers of alcohols having 1 to 5 carbon atoms. Examples of such alcohols are ethanol, propanols, butanols, pentanols, hexanols, 2-ethylhexanol, or other octanols, methoxyethanol, ethoxyethanol, propoxyethanol, butoxyethanol, diethylene glycol monomethyl ether, diethylene glycol monoethyl ether, diethylene glycol monopropyl ether, and diethylene glycol monobutyl ether.

These cosurfactants can be contained in the micellar slugs of this invention in an amount of about 0.1% to about 20% by weight of the cosurfactants. However, the desirable concentration of the cosurfactants is within the range of about 1% to about 10% by weight from the viewpoints of the stability of the micro-emulsions and the decreasing capacity for interfacial tension between oil and water.

According to this invention, since the ethoxylate is used as one component of the surfactants in the micellar slugs, the micellar slugs have an excellent hard-water resistance and salinity tolerance. Furthermore, the composition range capable of forming the micro-emulsions can be widened, as compared with the case of only the alpha-olefin sulfonate being used, by the use of the specified amount of the ethoxylate together with the alpha-olefin sulfonate. Accordingly, when the micellar slugs of this invention are injected under pressure into subterranean reservoirs, the micro-emulsions can be maintained within a wide composition range against changes in the composition thereof caused by the mixing with oil and subterranean water. Furthermore, the viscosity of the micellar slug of this invention can be controlled to a wide range by appropriately selecting the kind of the hydrophobic group and the addition mole number of the ethylene oxide of the ethoxylate and the composition ratio. These advantageous features of this invention are especially very important, taking into account the facts that the micro-emulsions should be maintained in subterranean reservoirs and the viscosity of the micellar slugs of this invention should be somewhat or slightly higher than that of the oil in the subterranean reservoirs.

The viscosity of the micellar slugs of this invention can be desirably controlled to a wide range by selecting the appropriate ethoxylate. However, conventional thickening agents can be added to the micellar slugs of this invention to control the viscosity thereof. Examples of thickening agents usable in the formation of the micellar slugs are heteropolysaccharides produced by micro-organisms, naphthalenesulfonic acid-formaldehyde condensates, polyacrylamides, polyacrylates, hydroxyethylcelluloses, carboxymethyl-celluloses, and other water-soluble polymer substances.

The micellar slugs of this invention can be readily obtained by any known method of production. For example, the hydrocarbons, the surfactants, the aqueous medium, and the cosurfactants can be mixed in any mixing order by using conventional mixing devices, mixing temperatures, and mixing pressures.

The recovery of oil from subterranean reservoirs can be carried out by means of any conventional micellar drive method by using the micellar slugs of this invention. For instance, the micellar slugs are injected under pressure into at least one injection well of the subterranean reservoirs. Then, at least one driving fluid such as flood water and/or an aqueous solution of the above-mentioned thickening agent is injected into the injection well so as to transfer or drive the remaining oil toward an oil production well and to recover the oil from the production well. The suitable amount of the micellar slugs injected into the injection well is about 5% to about 25% by volume of the porosity of the subterranean reservoirs.

The present invention now will be further illustrated by, but is by no means limited to, the following examples, in which the component ratios or amounts of samples used are based on "% by weight" unless otherwise specified.

EXAMPLE 1

Micellar slug compositions were prepared by mixing 7% of sodium $C_{14}$–$C_{18}$ alpha-olefin sulfonate ($C_{14}$–$C_{18}$ AOS-Na) and 7% of nonionic surfactants listed in Table 1 as surfactants, 6% of n-amyl alcohol as a cosurfactant, 40% of fuel oil (ASTM No. 2 fuel oil) as a hydrocarbon, and 40% of brine having a NaCl content of 2%.

The formation of micro-emulsions was visually observed and the interfacial tensions between the micellar slugs and the oil and the viscosities were determined when the micro-emulsions were formed.

The interfacial tensions between the micellar slugs and the water were substantially the same as those between the micellar slugs and the oil.

The results are shown, together with the nonionic surfactants used, in Table 1.

The visual appearance was determined according to the following:

o ... A micro-emulsion was formed x ... A suspension was formed, or a two-phase separation occurred.

The interfacial tensions were measured by a spinning drop type tensionmeter at 25° C. The viscosities were measured by a Brookfield viscometer at 25° C.

TABLE 1

| Sample No. | Nonionic surfactant | | Visual appearance | Interfacial tension ($\times 10^{-3}$ dyne/cm) | Viscosity (cps) |
|---|---|---|---|---|---|
| 1 | Polyoxyethylene lauryl ether | (m = 2) | o | 3.72 | 62 |
| 2 | " | (m = 5) | o | 5.97 | 34 |
| 3 | " | (m = 15) | x | — | — |
| 4 | Polyoxyethylene stearyl ether | (m = 4) | o | 8.22 | 44 |
| 5 | " | (m = 8) | o | 9.43 | 36 |
| 6 | Polyoxyethylene octylphenyl ether | (n = 2) | o | 9.44 | 71 |
| 7 | " | (n = 6) | o | 8.73 | 35 |
| 8 | Polyoxyethylene nonylphenyl ether | (n = 5) | o | 6.88 | 47 |
| 9 | " | (n = 10) | o | 4.72 | 26 |
| 10 | " | (n = 20) | x | — | — |
| 11 | Polyoxyethylene dodecylphenyl ether | (n = 7) | o | 7.11 | 43 |
| 12 | " | (n = 12) | o | 9.72 | 22 |
| 13 | Pluronic L-44*[1] | | x | — | — |
| 14 | Pluronic P-84*[2] | | x | — | — |
| 15 | Tetronic 702*[3] | | x | — | — |

Remarks:
*[1]Ethylene oxide addition product of polypropylene glycol (EO40%, PPG MW = 1200) (available from Wyandotte Chemicals Corp. U.S.A.)
*[2]Ethylene oxide addition product of polypropylene glycol (EO40%, PPG MW = 2250) (available from Wyandotte Chemicals Corp. U.S.A.)
*[3]Ethylene oxide addition product of polypropylene polyol obtained in the presence of ethylene diamine initiator (EO20%, PPG MW = 2500) (available from Wyandotte Chemicals Corp. U.S.A.)

EXAMPLE 2

Micellar slug compositions were prepared by mixing, in amounts listed in Table 2, a 1/1 mixture of sodium petroleum sulfonate TRS-10 (Trademark manufactured by Witco Chemical Corporation, USA) or $C_{14}$-$C_{18}$ AOS-Na with polyoxyethylene lauryl ether (m=3), isopropyl alcohol or n-amyl alcohol, the fuel oil used in Example 1, and brine having a NaCl content of 2%.

The formation of micro-emulsions was visually observed and the interfacial tensions between the micellar slugs and the oil and the viscosities were determined when the micro-emulsions were formed in the same manner as in Example 1.

The results as well as the compounding ratios of the ingredients are shown in Table 2 below.

The results shown in Table 2 clearly illustrate that the micellar slugs capable of forming micro-emulsions can be obtained according to this invention.

EXAMPLE 3

Micellar slug compositions were prepared by mixing 14% or 12% of mixtures, in various mixing ratios, of $C_{14}$-$C_{18}$ AOS-Na and polyoxyethylene lauryl ether (m=3), 6% of n-amyl alcohol or 3% of isopropyl alcohol, 40% of the fuel oil used in Example 1 or 30% of kerosine, and 40% or 55% of brine having a NaCl content of 2%.

The formation of micro-emulsions was visually observed and the interfacial tensions between the micellar slugs and the oil and the viscosities were determined when the micro-emulsions were formed in the same manner as in Example 1.

The results as well as the composition ratios of the ingredients are shown in Table 3 below.

The results shown in Table 3 clearly illustrate that the weight ratios of AOS to the ethoxylate must be within the range of 8/2 to 3/7 to obtain micellar slugs capable of forming micro-emulsions in a wide composition ratio.

EXAMPLE 4

Micellar slug compositions were prepared by using, as surfactants, AOS, polyoxyethylene lauryl ether (m=3), and polyoxyethylene nonylphenyl ether (n=5). The formation of micro-emulsions was visually observed and the interfacial tensions between the micellar slugs and the oil and the viscosities were determined.

The results as well as the compositions of the micellar slug compositions are shown in Table 4 below.

TABLE 2

| | | Sample No. | | | | | | | | | | | | |
|---|---|---|---|---|---|---|---|---|---|---|---|---|---|---|
| | | 18 | 19 | 20 | 21 | 22 | 23 | 24 | 25 | 26 | 27 | 28 | 29 | 30 | 31 |
| TRS-10 | (%) | — | 14 | — | 14 | — | 14 | — | 10.5 | — | 10.5 | — | 10.5 | — | 7 |
| $C_{14}$—$C_{18}$ AOS—Na | (%) | 7 | — | 7 | — | 7 | — | 5.25 | — | 5.25 | — | 5.25 | — | 3.5 | — |
| Polyoxyethylene lauryl ether (m = 3) | (%) | 7 | — | 7 | — | 7 | — | 5.25 | — | 5.25 | — | 5.25 | — | 3.5 | — |
| Isopropyl alcohol | (%) | — | — | — | — | — | — | 4.5 | 4.5 | 4.5 | 4.5 | 4.5 | 4.5 | — | — |
| n-amyl alcohol | (%) | 6 | 6 | 6 | 6 | 6 | 6 | — | — | — | — | — | — | 3 | 3 |
| Fuel oil | (%) | 20 | 20 | 40 | 40 | 70 | 70 | 15 | 15 | 35 | 35 | 60 | 60 | 10 | 10 |
| Brine (NaCl 2%) | (%) | 60 | 60 | 40 | 40 | 10 | 10 | 70 | 70 | 50 | 50 | 25 | 25 | 80 | 80 |
| Visual appearance | | o | x | o | x | o | o | o | x | o | x | o | o | o | x |
| Interfacial tension ($\times 10^{-3}$ dyne/cm) | | 12.83 | — | 2.81 | — | 9.63 | 12.33 | 9.92 | — | 6.38 | — | 7.76 | 10.91 | 9.98 | — |
| Viscosity (cps) | | 36 | — | 51 | — | 42 | 33 | 28 | — | 40 | — | 55 | 46 | 25 | — |

TABLE 3

| | | Sample No. | | | | | | | | | | | |
|---|---|---|---|---|---|---|---|---|---|---|---|---|---|
| | | 32 | 33 | 34 | 35 | 36 | 37 | 38 | 39 | 40 | 41 | 42 | 43 |
| $C_{14}$—$C_{18}$ AOS—Na | (%) | 12.0 | 10.5 | 8.5 | 6.5 | 4.5 | 3.3 | — | 10.0 | 9.2 | 6.0 | 4.2 | 3.2 |
| Polyoxyethylene lauryl ether (m = 3) | (%) | 2.0 | 3.5 | 5.5 | 7.5 | 9.5 | 10.7 | 14.0 | 2.0 | 2.8 | 6.0 | 7.8 | 8.8 |
| Isopropyl alcohol | (%) | — | — | — | — | — | — | — | 3 | 3 | 3 | 3 | 3 |
| n-amyl alcohol | (%) | 6 | 6 | 6 | 6 | 6 | 6 | 6 | — | — | — | — | — |
| Kerosine | (%) | — | — | — | — | — | — | — | 30 | 30 | 30 | 30 | 30 |
| Fuel oil | (%) | 40 | 40 | 40 | 40 | 40 | 40 | 40 | — | — | — | — | — |
| Brine (NaCl 2%) | (%) | 40 | 40 | 40 | 40 | 40 | 40 | 40 | 55 | 55 | 55 | 55 | 55 |
| Visual appearance | | x | o | o | o | o | x | x | x | o | o | o | x |
| Interfacial tension ($\times 10^{-3}$ dyne/cm) | | — | 2.77 | 3.41 | 5.47 | 10.93 | — | — | — | 4.87 | 5.96 | 13.87 | — |
| Viscosity (cps) | | — | 120 | 74 | 43 | 22 | — | — | — | 165 | 70 | 41 | — |

TABLE 4

| | | Sample No. | | | | | | | | | | | |
|---|---|---|---|---|---|---|---|---|---|---|---|---|---|
| | | 44 | 45 | 46 | 47 | 48 | 49 | 50 | 51 | 52 | 53 | 54 | 55 |
| $C_{14}$—$C_{18}$ AOS—Na | (%) | 6.0 | 4.0 | 2.0 | 1.0 | — | — | — | 5.5 | 3.0 | 3.0 | 8.0 | 3.0 |
| $C_{20}$—$C_{24}$ AOS—Na | (%) | — | 1.2 | 2.0 | 1.8 | 5.5 | 3.0 | 5.0 | — | — | 3.0 | — | 3.0 |
| Polyoxyethylene lauryl ether (m = 3) | (%) | — | — | — | — | — | 4.0 | 1.0 | 1.0 | 3.0 | — | 4.0 | — |
| Polyoxyethylene nonylphenyl ether (n = 5) | (%) | 2.0 | 2.8 | 4.0 | 5.2 | 2.5 | — | 1.0 | 0.5 | — | 3.0 | — | 6.0 |
| Isopropyl alcohol | (%) | — | — | — | — | — | 3.0 | 3.0 | 3.0 | 2.0 | 0.5 | 3.0 | 6.0 |
| n-Amyl alcohol | (%) | 2.0 | 2.0 | 2.0 | 2.0 | 2.0 | — | — | — | 2.0 | 0.5 | — | — |
| Kerosine | (%) | — | — | — | — | — | 40 | 20 | 30 | 70 | 35 | — | 65 |
| Fuel oil | (%) | 20 | 30 | 45 | 70 | 40 | — | — | 20 | — | — | 35 | — |
| Brine (NaCl 0.5%) | (%) | — | — | — | 20 | — | 50 | — | — | 10 | — | — | 20 |
| Brine (NaCl 2%) | (%) | — | — | 45 | — | 50 | — | 70 | — | — | 55 | — | — |
| Brine (NaCl 5%) | (%) | — | 60 | — | — | — | — | — | — | — | — | — | — |
| Seawater | (%) | 70 | — | — | — | — | — | — | 40 | — | — | 50 | — |
| Visual appearance | | o | o | o | o | o | o | o | o | o | o | o | o |

TABLE 4-continued

| | Sample No. | | | | | | | | | | | |
|---|---|---|---|---|---|---|---|---|---|---|---|---|
| | 44 | 45 | 46 | 47 | 48 | 49 | 50 | 51 | 52 | 53 | 54 | 55 |
| Interfacial tension ($\times 10^{-3}$ dyne/cm) | 14.31 | 8.45 | 6.32 | 7.89 | 4.59 | 6.67 | 5.27 | 7.73 | 13.46 | 9.73 | 7.72 | 16.71 |
| Viscosity (cps) | 44 | 89 | 43 | 27 | 38 | 17 | 23 | 71 | 26 | 57 | 49 | 12 |

We claim:

1. A micellar slug for use in the recovery of oil, said slug consisting essentially of 4% to 90% by weight of a hydrocarbon, 10% to 92% by weight of an aqueous medium, 3% to 30% by weight of a surfactant, and 0.1% to 20% by weight of a cosurfactant, said surfactant containing, as essential components, (a) at least one alpha-olefin sulfonate having 10 to 30 carbon atoms and (b) at least one ethoxylate selected from the group consisting of polyoxyethylene alkyl ethers having the formula:

wherein $R^1$ is a linear or branched alkyl or alkenyl group having 10 to 18 carbon atoms and m is a number of about 1 to about 10 on the average, and polyoxyethylene alkylphenyl ethers having the formula:

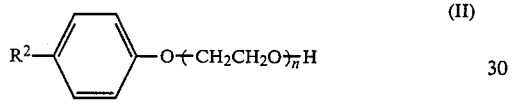

wherein $R^2$ is a linear or branched alkyl group having 6 to 15 carbon atoms and n is a number of about 1 to about 15 on the average, in a weight ratio of component (a) to component (b) of 8/2 to 3/7.

2. A process for producing oil from an oil-bearing subterranean reservoir penetrated by a well which comprises the steps of:

(1) injecting into said reservoir through said well a micellar slug consisting essentially of 4% to 90% by weight of a hydrocarbon, 10% to 92% by weight of an aqueous, 3% to 30% by weight of a surfactant, and 0.1% to 20% by weight of a cosurfactant, said cosurfactant containing, as essential components, (a) at least one alpha-olefin sulfonate having 10 to 30 carbon atoms and (b) at least one ethoxylate selected from the group consisting of polyoxyethylene alkyl ethers having the formula:

wherein $R^1$ is a linear or branched alkyl or alkenyl group having 10 to 18 carbon atoms and m is a number of about 1 to about 10 on the average, and polyoxyethylene alkylphenyl ethers having the formula:

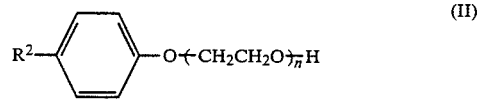

wherein $R^2$ is a linear or branched alkylphenyl group having 6 to 15 carbon atoms and n is a number of about 1 to about 15 on the average, in a weight ratio of component (a) to component (b) of 8/2 to 3/7;

(2) injecting into said reservoir at least one driving fluid; and (3) recovering oil from said reservoir through the production well.

* * * * *